United States Patent [19]

Okamoto et al.

[11] 4,452,931
[45] Jun. 5, 1984

[54] FLAME-RETARDANT POLYAMIDE RESIN COMPOSITION

[75] Inventors: Hidemasa Okamoto; Mitsuo Yamanaka; Mokoto Takahashi, all of Hirakata, Japan

[73] Assignee: UBE Industries, Ltd., Yamaguchi, Japan

[21] Appl. No.: 478,377

[22] Filed: Mar. 24, 1983

[30] Foreign Application Priority Data

Mar. 30, 1982 [JP] Japan .................................. 57-50039
Apr. 13, 1982 [JP] Japan .................................. 57-60351

[51] Int. Cl.$^3$ ........................ C08K 5/09; C08K 5/34
[52] U.S. Cl. ............................... 524/100; 524/101; 524/112; 524/287; 524/300; 524/322
[58] Field of Search .............. 524/83, 100, 101, 112, 524/217, 287, 296, 300, 322; 544/198

[56] References Cited

U.S. PATENT DOCUMENTS

| | | | |
|---|---|---|---|
| 2,544,071 | 3/1951 | Dudley | 544/198 |
| 4,208,320 | 6/1980 | Chono et al. | 524/100 |
| 4,314,927 | 2/1982 | Theysohn et al. | 524/100 |
| 4,383,064 | 5/1983 | Iida | 524/100 |

Primary Examiner—John Kight, III
Assistant Examiner—R. A. White
Attorney, Agent, or Firm—Burgess, Ryan & Wayne

[57] ABSTRACT

A flame-retardant polyamide resin composition having an excellent flame-retarding property clearing over the level V-0 of the UL-94 Standard contains a flame retarder consisting essentially of:

(1) a first flame-retarder component consisting essentially of at least one melamine derivative of the formula (I)

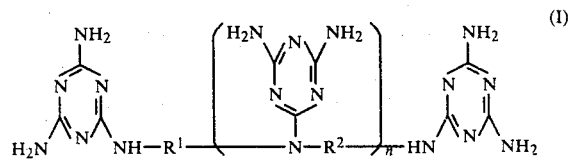

wherein $R^1$ and $R^2$ represent, independently from each other, a divalent hydrocarbon radical having 1 to 15 carbon atoms and n represents zero or an integer of 1 to 5, and (2) a second flame-retarder component consisting essentially of at least one member selected from unsubstituted and substituted melamine cyanurate compounds and unsubstituted and substituted organic carboxylic acids and anhydrides having a boiling point and/or a decomposition point higher than the melting point of the polyamide resin matrix.

5 Claims, No Drawings

FLAME-RETARDANT POLYAMIDE RESIN COMPOSITION

BACKGROUND OF THE INVENTION

1. Field of the Invention

The present invention relates to a flame-retardant polyamide resin composition. More particularly, the present invention relates to a flame-retardant polyamide resin composition adequate for producing shaped articles having excellent flame resistance and other physical and chemical properties and having a satisfactory appearance.

2. Description of the Prior Art

It is known from, for example, Japanese Examined Patent Publication (Kokoku) No. 47-41745 (1972) and Japanese Unexamined Patent Publication (Kokai) No. 51-39750 (1976) that a polyamide resin can be blended with a flame retarder consisting of melamine, cyanuric acid, and/or isocyanuric acid to impart a flame-retarding property to the polyamide resin. It is also known that the flame-retarding effect of cyanuric acid and isocyanuric acid is superior to that of melamine.

Polyamide resin compositions containing the above-mentioned conventional flame retarders are, however, disadvantageous in that when the compositions are molded, the flame retarder sublimes at the molding temperature and soils the mold. Also, if the resultant shaped article is exposed to a moisture-containing atmosphere or is stored for a long period of time, a portion of the flame retarder moves from the inside to the outer surface of the shaped article to form a thin layer of fine flame retarder particles degrading the appearance of the shaped article. This latter phenomenon is referred to as bleeding out.

When cyanuric acid and/or isocyanuric acid is used as a flame retarder, the resultant shaped article has the further disadvantage, that the cyanuric and/or isocyanuric acid decomposes during the shaping process and generates bubbles distributed in a portion of the shaped article.

In order to eliminate the above-mentioned disadvantages of conventional flame retarders containing melamine, cyanuric acid, and/or isocyanuric acid, it has been attempted to use, as a flame retarder, an equimolar reaction product of melamine with cyanuric acid, that is, melamine cyanurate. This attempt is disclosed in U.S. Pat. No. 4,298,518. The flame retarder comprising melamine cyanurate is considerably effective for decreasing the disadvantages of the flame retarders containing melamine, cyanuric acid, and/or isocyanuric acid. However, this type of flame-retarder comprising melamine cyanurate is still not satisfactory when used for producing part members of electrical machinery and apparatuses requiring a very high flame-retarding property.

According to the experience of the present inventors, the flame-retarding effect of the melamine cyanurate was deemed to be poorer than that of melamine and cyanuric acid. For example, a composition consisting of 80% by weight of a nylon 6 resin and 20% by weight of melamine can meet the flame-retarding level V-0 in accordance with UL-94 (Underwriters Laboratories Inc. of U.S.A.) Standard. In order to meet the flame-retarding level V-0, it is necessary that five test specimens satisfy all of three items, that is, (1) an average combustion time of the specimens must be 5 seconds or less, (2) a longest combustion time must be 10 seconds or less, and (3) in all of combustion tests repeated for five specimens, when an absorbent cotton wadding mass is placed 12 inches below the lower ends of the specimens, no cotton wadding mass may be burnt by molten drops from the specimens.

In the case of a composition consisting of 80% by weight of a nylon 6 resin and 20% by weight of melamine cyanurate, the test specimens prepared from the composition can satisfy only items (1) and (2) and not item (3). That is, when the five specimens are subjected in sequence to the combustion test (V-0 level), one or two specimens always suffer from burning of the absorbent cotton mass by molten drops. That is, the composition consisting of the polyamide resin and melamine cyanurate cannot meet the flame-retarding level V-0 of the UL-94 Standard.

In another attempt for eliminating the disadvantages of melamine, cyanuric acid, and isocyanuric acid, Japanese Unexamined Patent Publication (Kokai) Nos. 53-47451 (1978) and 56-22347 (1981) disclose flame-retardant polyamide resin compositions containing a melamine derivative, for example, methylene dimelamine or ethylene dimelamine, as a flame retarder. Studies by the present inventors showed that although the flame retarder comprising the above-mentioned melamine derivative exhibited a superior effect in imparting flame resistance to the polyamide resin compared to melamine cyanurate, the flame-retarding property of the resultant polyamide composition containing about 10% by weight or less of the melamine derivative is not always satisfactory and, therefore, should be improved.

Under the above-mentioned circumstances, there is great demand in the polyamide resin industry for a new type of flame-retardant polyamide resin composition which exhibits an excellent flame retarding property and is free from the disadvantages of the conventional compositions.

SUMMARY OF THE INVENTION

An object of the present invention is to provide a flame-retardant polyamide resin composition capable of producing shaped articles which exhibit an excellent flame-retarding property meeting or exceeding the requirements of level V-0 of the UL-94 Standard.

Another object of the present invention is to provide a flame-retardant polyamide resin composition free from undesirable sublimation, bleeding out, and thermal decomposition of the flame retarder.

The above-mentioned objects can be attained by the flame-retardant polyamide resin composition of the present invention, which comprises (A) a polyamide resin matrix; and (B) 1% to 50% based on the weight of the polyamide resin matrix, of a flame retarder consisting essentially of:

(1) a first flame-retarder component consisting essentially of at least one melamine derivative of the formula (I)

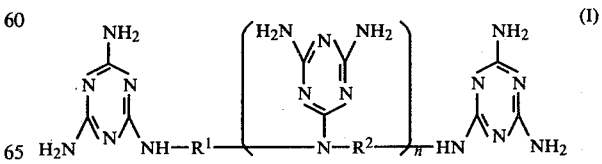

wherein $R^1$ and $R^2$ represent, independently from each other, a divalent hydrocarbon radical having 1 to 15 carbon atoms and n represents zero or an integer of 1 to 5, and (2) a second flame retarder component consisting essentially of at least one member selected from the group consisting of unsubstituted and substituted melamine cyanurate compounds and unsubstituted and substituted organic carboxylic acids and anhydrides having a boiling point and/or a decomposition point higher than the melting point of the polyamide resin matrix.

DESCRIPTION OF THE PREFERRED EMBODIMENTS

In the flame-retardant polyamide resin compound of the present invention, a specific flame retarder is blended to a polyamide resin matrix.

The polyamide resin matrix comprises at least one member selected from the group consisting of polylactams, for example, nylon 6, nylon 11, and nylon 12; polymerization products of dicarboxylic acids with diamines, for instance, nylon 66, nylon 610, and nylon 612; and copolyamides, for instance, nylon 6/66 and nylon 6/66/610, which have a melting point in the range of from 50° C. to 300° C.

The specific flame retarder usable for the present invention comprises a specific first flame-retarder component consisting of at least one melamine derivative of the formula (I) and a specific second flame retarder component consisting of at least one member selected from unsubstituted and substituted melamine cyanurate compounds and unsubstituted and substituted organic carboxylic acids and anhydrides thereof.

The inventors of the present invention have discovered for the first time that when the specific first flame-retarder component is used together with the specific second flame-retarder component, the resultant flame-retarder surprisingly exhibits an extremely excellent flame-retarding properties not expected from the inherent flame-retarding properties of the first and second flame-retarder components.

The first flame-retarder component consists of at least one melamine derivative of the formula (I):

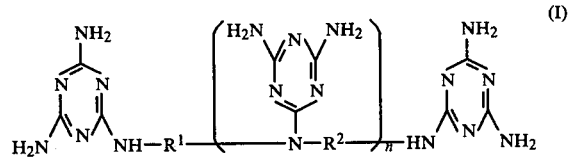

wherein $R^1$ and $R^2$ represent, independently from each other, a divalent hydrocarbon radical having 1 to 15 carbon atoms and n represents zero or an integer of 1 to 5.

The melamine derivative of the formula (I) can be selected from the group consisting of, for example, methylene dimelamine, ethylene dimelamine, trimethylene dimelamine, tetramethylene dimelamine, hexamethylene dimelamine, decamethylene dimelamine, dodecamethylene dimelamine, 1,3-cyclohexylene dimelamine, p-phenylene dimelamine, p-xylylene dimelamine, 4,4'-dityrene dimelamine, diethylene trimelamine, triethylene tetramelamine, tetraethylene pentamelamine, and hexaethylene heptamelamine.

The first flame-retarder component may consist of a single melamine derivative of the formula (I) or a mixture of two or more of the melamine derivatives of the formula (I).

The melamine cyanurate compounds usable for the present invention can be selected from the group consisting of, for example, unsubstituted melamine cyanurate, which is an equimolar reaction product of melamine with cyanuric acid, and substituted melamine cyanurate compounds having at least one substituent selected from methyl, phenyl, carboxymethyl, 2-carboxyethyl, cyanomethyl, and 2-cyanoethyl radicals substituted for amino radicals and/or hydroxyl radicals in the melamine cyanurate structure.

In the flame-retarder usable for the present invention, the melamine cyanurate compounds are not always required to be highly pure. That is, the melamine cyanurate compounds are allowed to contain therein a small amount of impurities, for example, unreacted reagents used in the preparation of the compounds or other impurities, unless the impurities hinder the attainment of the objects of the present invention.

The unsubstituted and substituted organic carboxylic acids and anhydrides usable for the present invention are ones having a boiling point and/or a decomposition point higher than, preferably, 10° C. or more above, the melting point of the polyamide resin matrix.

If the boiling point and/or the decomposition point of the carboxylic acid and/or anhydride compound used is not higher than the melting point of the polyamide resin matrix, when the resultant composition is processed at a temperature of the melting point or higher of the polyamide resin matrix, a portion of the flame retarder is sublimated or thermally decomposed and, therefore, the resultant processed product exhibits an unsatisfactory flame-retarding property.

The carboxylic acids usable for the present invention include aliphatic monocarboxylic acids, for example, capric acid, undecanoic acid, lauric acid, tridecanoic acid, myristic acid, pentadecanoic acid, hexadecanoic acid, heptadecanoic acid, stearic acid, nonadecanoic acid, eicosanic acid, and behenic acid; aliphatic dicarboxylic acids, for example, maloic acid, succinic acid, glutaric acid, adipic acid, pimelic acid, suberic acid, azelaic acid, sebacic acid, 1,9-nonanedicarboxylic acid, 1,10-decanedicarboxylic acid, 1,11-undecanedicarboxylic acid, 1,12-dodecanedicarboxylic acid, 1,13-tridecanedicarboxylic acid, and 1,14-tetradecanedicarboxylic acid; aromatic monocarboxylic acids, for example, benzoic acid, phenylacetic acid, α-naphthoic acid, β-naphthoic acid, cinnamic acid, p-aminohippuric acid, and 4-(2-thiazoylsulfamyl)-phthalaninoic acid; aromatic dicarboxylic acids, for example, terephthalic acid, isophthalic acid, and phthalic acid; aromatic tricarboxylic acids, for example, trimellitic acid, 1,3,5-benzenetricarboxylic acid, and tris (2-carboxyethyl) isocyanurate; aromatic tetracarboxylic acids, for example, pyromellitic acid and biphenyltetracarboxylic acid; cycloaliphatic monocarboxylic acids, for example, cyclohexanecarboxylic acid; and cycloaliphatic dicarboxylic acids, for example, 1,2-cyclohexane dicarboxylic acid.

The carboxylic anhydrides usable for the present invention include succinic anhydride, glutaric anhydride, phthalic anhydride, pyromellitic anhydride, and biphenyltetracarboxylic anhydride.

The carboxylic acids and anhydrides may have at least one substituent selected from the group consisting of hydroxyl, amino, cyano, and hydrocarbon radicals and halogen atoms. The substituted carboxylic acids and anhydrides include, for example, 11-aminoundecanoic acid, 12-aminododecanoic acid, 11-cyanoundecanoic acid, p-toluic acid, p-bromobenzoic acid, p-hydroxybenzoic acid, and p-aminobenzoic acid.

The above-mentioned carboxylic acid compounds have a boiling point and/or a decomposition point in the range of from 150° C. to 500° C.

In the flame-retardant polyamide resin compound of the present invention, the flame-retarder is contained therein in an amount of from a 1% to 50%, preferably, 3% to 30%, based on the weight of the polyamide resin matrix. When the amount of the flame retarder is less than 1%, the resultant composition exhibits an unsatisfactory flame retarding property. Also, an amount of the flame retarder of more than 50% causes the resultant composition to exhibit unsatisfactory physical properties compared with the inherent physical properties of the polyamide resin matrix.

Usually, the ratio in weight of the first flame-retarder component to the second flame-retarder component consisting of a melamine cyanurate compound is preferably in the range of from 99:1 to 1:99, more preferably, from 95:5 to 5:95.

Also, in the case where the second flame-retarder component consists of an organic carboxylic acid compound, the ratio in weight of the first flame-retarder component to the second flame-retarder component is preferably in the range of from 99.8:02 to 17:83, more preferably from 99.5:0.5 to 75:25.

The polyamide resin can be mixed with the necessary amount of the flame retarder by a conventional mixing method. For example, polyamide resin in the form of pellets or of powder can be dry mixed with the flame retarder in the form of fine particles or grains by using a conventional mixer. In another method, the polyamide resin and the flame retarder are blended and melted in an extruder and the resultant melt blend is extruded from the extruder.

The flame-retardant polyamide resin composition of the present invention may contain a small amount of an additive consisting of at least one member selected from antioxidants, lubricants, inorganic fillers, and coloring materials.

The present invention will be further illustrated by the following examples.

In the examples, the flame-retarding property and the bleeding out property of the polyamide resin composition were tested as follows.

1. Combustion Test

A. UL-94 Standard

The polyamide resin composition to be tested was converted to a plurality of specimens having a length of 5 inches, a width of ½ inches, and a thickness of 1/32 inches. The combustion tests for the specimens were carried out in accordance with Subject 94 (UL-94) of Underwriters Laboratories Inc., U.S.A..

B. Limiting Oxygen Index (L.O.I.)

The polyamide resin composition to be tested was converted to a plurality of specimens having a length of 5 inches, a width of ¼ inches, and a thickness of 1/16 inches. The limiting oxygen index of each specimen was measured in accordance with ASTM D2863 by using a candle type combustion test machine made by Toyo Seiki C., Japan.

2. Bleeding Out (Blooming) Test

A resinous blend was prepared by blending a flame-retarder-containing polyamide resin composition to be tested with 0.5% by weight of carbon black. The blend was converted to a plurality of specimens having a length of 80 mm, a width of 80 mm, and a thickness of 2 mm. The specimens were exposed to an air atmosphere having a temperature of 40° C. and a relative humidity of 95% for 10 days.

The intensity of bleeding out (blooming) of the flame retarder to the outer surfaces of the specimens was evaluated by naked eye observation.

EXAMPLES 1 THROUGH 6

In each of Examples 1 through 6, a resinous blend was prepared from 90 parts by weight of nylon 6 pellets having a number average molecular weight of 13,000 and a melting point of 215° C., 10 parts by weight of ethylene dimelamine, and 0.5 parts by weight of the carboxylic acid indicated in Table 1. The blend was melted at a temperature of 230° C. and converted to pellets by using an extruder and a pelletizer.

A plurality of specimens for the combustion test were prepared from the pellets by means of heat press-molding at a temperature of 230° C.

Separately, a resinous blend consisting of 90 parts by weight of the same nylon 6 as mentioned above, 10 parts by weight of ethylene dimelamine, 0.5 parts by weight of the same carboxylic acid as that used above and 0.5 parts by weight of carbon black, was converted to pellets by the same process as that mentioned above. The pellets were converted to a plurality of specimens for testing the bleeding out (blooming) property of the flame retarder used, by the same means as that mentioned above.

The results of the tests are indicated in Table 1.

COMPARATIVE EXAMPLE 1

The same procedures as those described in Example 1 were carried out except that no carboxylic acid was used as a flame-retarder component.

The results of the tests are indicated in Table 1.

TABLE 1

| Example No. | | Carboxylic acid | | UL-94 | L.O.I. | Bleed out property |
|---|---|---|---|---|---|---|
| | | Type | Decomposition temperature (°C.)* | | | |
| Example | 1 | Sebacic acid | 237 | V-0 | 31.6 | none |
| | 2 | 1,10-decanedicarboxylic acid | 235 | V-0 | 33.8 | none |
| | 3 | Aminododecanoic acid | 253 | V-0 | 32.0 | none |
| | 4 | Phthalic anhydride | 285 | V-0 | 31.0 | none |
| | 5 | Isophthalic acid | 250 | V-0 | 34.2 | none |
| | 6 | Tris (2-carboxylethyl) isocyanate | 260 | V-0 | 34.2 | none |
| Comparative | 1 | none | — | V-2 | 28.9 | none |

TABLE 1-continued

| | Carboxylic acid | | | | |
|---|---|---|---|---|---|
| Example No. | Type | Decomposition temperature (°C.)* | UL-94 | L.O.I. | Bleed out property |
| Example | | | | | |

Note
*The decomposition temperature were determined by means of thermogravimetric analysis.

EXAMPLES 7 THROUGH 9

In each of Examples 7 through 9, a resinous blend consisting of 90 parts by weight of nylon 6 pellets having a number average molecular weight of 13,000 and a melting point of 215° C., 10 parts by weight of a melamine derivative indicated in Table 2, and 0.5 parts by weight of tris (2-carboxyethyl) isocyanurate having a melting point of 235° C. was converted to pellets in the same manner as that mentioned in Example 1.

The pellets were converted to a plurality of specimens for the combustion tests.

The same procedures as those mentioned above were carried out, except that 0.5 parts by weight of carbon black were additionally blended, to provide a plurality of specimens for the bleeding out test.

The results of the tests are indicated in Table 2.

COMPARATIVE EXAMPLES 2 THROUGH 4

In Comparative Examples 2, 3, and 4, the same procedures as those respectively described in Examples 7, 8, and 9 were carried out, except that no tris(2-carboxyethyl)isocyanurate was used.

The results of the tests are shown in Table 2.

TABLE 2

| Example No. | | Melamine derivative | Tris (2-carboxyethyl) isocyanurate | UL-94 | L.O.I. | Bleed out |
|---|---|---|---|---|---|---|
| Example | 7 | Trimethylene dimelamine | Contained | V-0 | 34.1 | none |
| | 8 | 4,4'-ditylene dimelamine | Contained | V-0 | 33.7 | none |
| | 9 | Diethylene trimelamine | Contained | V-0 | 33.6 | none |
| | 2 | Trimethylene dimelamine | not contained | V-2 | 28.7 | not tested |
| Comparative | 3 | 4,4'-ditylene dimelamine | not contained | V-2 | 28.5 | not tested |
| Example | 4 | Diethylene trimelamine | not contained | V-2 | 28.6 | not tested |

EXAMPLES 10 THROUGH 14

In each of Examples 10 through 14, resinous blend pellets were prepared from 90 parts by weight of nylon 6 pellets having a number average molecular weight of 13,000 and 10 parts by weight of a mixture of ethylene dimelamine and melamine cyanurate in the weight proportion indicated in Table 3, by the same method as mentioned in Example 1.

The resinous blend pellets were converted to a plurality of specimens for the combustion tests in the same manner as that described in Example 1.

Separately, the same procedures as those described above were carried out, except that 0.5 parts by weight of carbon black were added, to provide a plurality of specimens for the bleeding out test.

The results of the tests are indicated in Table 3.

COMPARATIVE EXAMPLES 5 AND 6

In each of Comparative Examples 5 and 6, the same procedures as those described in Example 10 were carried out except that, in Comparative Example 5, ethylene dimelamine was used in an amount of 10 parts by weight, and no melamine cyanurate was used and, in Comparative Example 6, melamine cyanurate was used in an amount of 10 parts by weight and no ethylene dimelamine was added.

The results of the tests are indicated in Table 3.

EXAMPLE 15

The same procedures as those described in Example 10 were carried out except that the resinous blend pellets comprised 95 parts by weight of nylon 6 pellets having a number average molecule weight of 11,000, 2.5 parts by weight of ethylene dimelamine, and 2.5 parts by weight of melamine cyanurate.

The results of the tests are indicated in Table 3.

TABLE 3

| | | Proportion (parts by wt.) | | | | |
|---|---|---|---|---|---|---|
| Example No. | | Ethylene dimel-amine | Melamine cyanurate | UL-94 | L.O.I. | Bleed-ing out |
| Example | 10 | 9 | 1 | V-0 | 30.7 | none |
| | 11 | 7.5 | 2.5 | V-0 | 32.5 | none |
| | 12 | 5 | 5 | V-0 | 34.2 | none |
| | 13 | 2.5 | 7.5 | V-0 | 31.6 | none |
| | 14 | 1 | 9 | V-0 | 29.7 | none |
| | 15 | 2.5 | 2.5 | V-0 | 29.5 | none |
| Comparative | 5 | 10 | 0 | V-2 | 28.9 | none |
| Example | 6 | 0 | 10 | V-2 | 27.8 | none |

Table 3 clearly shows that the flame-retardant compositions of the present invention exhibit an excellent flame-retarding property even if the amount of the flame retarder is smaller, for example, as the case of Example 15.

EXAMPLES 16 THROUGH 18

In each of Examples 16 through 18, the same procedures as those described in Example 10 were carried out, except that the flame retarder used was composed of 5 parts by weight of the melamine derivative indicated in Table 4 and 5 parts by weight of melamine cyanurate.

The results of the tests are indicated in Table 4.

TABLE 4

| Example No. | Flame-retarder component (Parts by wt.) | | Melamine cyanurate Amount | UL-94 | L.O.I. | Bleeding out |
|---|---|---|---|---|---|---|
| | Melamine derivative Type | Amount | | | | |
| Example 16 | Trimethylene dimelamine | 5 | 5 | V-0 | 34.0 | none |
| 17 | 4,4'-ditylene dimelamine | 5 | 5 | V-0 | 33.5 | none |
| 18 | Diethylene trimelamine | 5 | 5 | V-0 | 33.4 | none |

We claim:
1. A flame-retardant polyamide resin composition comprising:
   (A) a polyamide resin matrix; and
   (B) 1% to 50% based on the weight of said polyamide resin matrix, of a flame retarder consisting essentially of:
      (1) a first flame-retarder component consisting essentially of at least one melamine derivative of the formula (I)

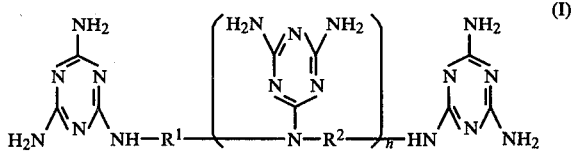

wherein $R^1$ and $R^2$ represent, independently from each other, a divalent hydrocarbon radical having 1 to 15 carbon atoms and n represents zero or an integer of 1 to 5, and
      (2) a second flame-retarder component consisting essentially of at least one member selected from the group consisting of melamine cyanurate, and substituted melamine cyanurate compounds having at least one substituent selected from methyl, phenyl, carboxymethyl, 2-carboxyethyl, cyanomethyl and 2-cyanomethyl radicals substituted for amino radicals and/or hydroxyl radicals in the melamine cyanurate structure.

2. The flame-retardant polyamide resin composition as claimed in claim 1, wherein the amount of said flame retarder is in the range of from 3% to 30% based on the weight of said polyamide resin matrix.

3. The flame-retardant polyamide resin composition as claimed in claim 1, wherein the ratio in weight of said first flame-retarder component to said second flame-retarder component consisting of said melamine cyanurate compound is in the range of from 99:1 to 1:99.

4. The flame-retardant polyamide resin composition as claimed in claim 1, wherein said polyamide resin matrix comprises at least one member selected from the group consisting of nylon 6, nylon 11, nylon 12, nylon 66, nylon 610, nylon 612, nylon 6/66, and nylon 6/66/610.

5. The flame retardant polyamide resin composition as claimed in claim 1, wherein said melamine derivative of the formula (I) is selected from the group consisting of methylene dimelamine, ethylene dimelamine, trimethylene dimelamine, tetramethylene dimelamine, hexamethylene dimelamine, decamethylene dimelamine, dodecamethylene dimelamine, 1,3-cyclohexylene dimelamine, p-phenylene dimelamine, p-xylylene dimelamine, 4,4'-ditylene dimelamine, diethylene trimelamine, triethylene tetramelamine, tetraethylene pentamelamine, and hexaethylene heptamelamine.

* * * * *